(12) United States Patent
Thrash

(10) Patent No.: US 12,352,134 B2
(45) Date of Patent: Jul. 8, 2025

(54) SYSTEM AND METHOD FOR PERMANENT STORAGE OF CARBON DIOXIDE IN SHALE RESERVOIRS

(71) Applicant: Prostim Labs, LLC, Houston, TX (US)

(72) Inventor: John F. Thrash, Houston, TX (US)

(*) Notice: Subject to any disclaimer, the term of this patent is extended or adjusted under 35 U.S.C. 154(b) by 0 days.

(21) Appl. No.: 18/892,007

(22) Filed: Sep. 20, 2024

(65) Prior Publication Data
US 2025/0012172 A1 Jan. 9, 2025

Related U.S. Application Data

(63) Continuation of application No. 18/217,514, filed on Jun. 30, 2023, now abandoned, which is a continuation of application No. 17/403,771, filed on Aug. 16, 2021, now abandoned, which is a continuation of application No. 15/677,474, filed on Aug. 15, 2017, now abandoned, which is a continuation-in-part of application No. 15/186,162, filed on Jun. 17, 2016, now abandoned.

(51) Int. Cl.
| | |
|---|---|
| *E21B 41/00* | (2006.01) |
| *C09K 8/60* | (2006.01) |
| *C09K 8/62* | (2006.01) |
| *C09K 8/80* | (2006.01) |
| *E21B 43/267* | (2006.01) |
| *E21B 43/40* | (2006.01) |

(52) U.S. Cl.
CPC ............ *E21B 41/0064* (2013.01); *C09K 8/60* (2013.01); *C09K 8/62* (2013.01); *C09K 8/80* (2013.01); *E21B 43/267* (2013.01); *E21B 43/40* (2013.01); *Y02C 20/40* (2020.08)

(58) Field of Classification Search
CPC ..................................................... E21B 43/26
See application file for complete search history.

(56) References Cited

U.S. PATENT DOCUMENTS

| | | | |
|---|---|---|---|
| 5,501,275 A * | 3/1996 | Card | C09K 8/665 166/292 |
| 6,820,689 B2 | 11/2004 | Sarada | |
| 2012/0067568 A1 * | 3/2012 | Palmer | E21B 43/40 166/402 |

OTHER PUBLICATIONS

The Hartford Loss Control Department (Understanding Silica, 2002).
Numerical Simulation and Modeling of Enhanced Gas Recovery and CO2 Sequestration in Shale Gas Reservoirs (Amirmasound K. Dahaghi, West Virginia University, Society of Petroleum Engineers 2010).
Carbon Dioxide Storage Capacity of Organic-Rich Shales (S.M. Kang, E. Fathi, R.J. Ambrose, I.Y. Akkutlu, and R.F. Sigal, The University of Oklahoma, Society of Petroleum Engineers 2011).
(Continued)

*Primary Examiner* — William D Hutton, Jr.
*Assistant Examiner* — Avi T Skaist
(74) *Attorney, Agent, or Firm* — HULSEY P.C.

(57) ABSTRACT

The present disclosure provides a system, method and apparatus for the removal of natural gas/methane from in situ loci within shale reservoirs to (i) provide fully de-carbonized surplus electricity, and (ii) power re-injection of the resulting carbon formed ($CO_2$) upon combustion in an electric generator along with large volumes of atmospheric $CO_2$, such as for large scale removal of $CO_2$ from the Earth's surface/atmosphere.

23 Claims, 9 Drawing Sheets

(56) References Cited

OTHER PUBLICATIONS https://www.netl.doe.gov/publications/proceedings/01/carbon_seq/7b1.pdf.
http://mitei.mit.edu/news/new-way-capture-co2-emissions-lower-costs-easier-installation.
https://www.globalccsinstitute.com/content/how-ccs-works-capture.
http://www.ccsassociation.org/index.php/what-is-ccs/capture/post-combustion-capture/.
http://www.ccsassociation.org/what-is-ccs/capture/oxy-fuel-combustion-systems/.

* cited by examiner

METHOD 600

SYSTEM AND METHOD FOR PERMANENT STORAGE OF CARBON DIOXIDE IN SHALE RESERVOIRS

CROSS-REFERENCE TO RELATED APPLICATIONS

This application is a continuation of U.S. Non-Provisional application Ser. No. 18/217,514, filed Jun. 30, 2023; which is a continuation of U.S. Non-Provisional application Ser. No. 17/403,771, filed Aug. 16, 2021 (now abandoned); which is a continuation of U.S. Non-Provisional patent application Ser. No. 15/677,474, filed Aug. 15, 2017 (now abandoned); which is a continuation in part of U.S. Non-Provisional patent application Ser. No. 15/186,162, filed Jun. 17, 2016 (now abandoned); all of which are hereby incorporated by reference in their entirety.

FIELD OF THE INVENTION

The present disclosure relates generally to systems and methods for storing carbon dioxide, and more specifically, to systems and methods for permanently storing carbon dioxide in shale reservoirs.

BACKGROUND OF THE INVENTION

Carbon sequestration can be divided into two categories: the enhancement of the natural sinking rates of $CO_2$ and direct discharge of human generated $CO_2$.

The sequestration options in the first category include terrestrial sequestration by vegetation, ocean sequestration by fertilization, and an enhancement of the rock weathering process. In the direct discharge options, the $CO_2$ produced from large point sources, such as thermal power stations, would be captured and separated, then transported and injected either into the ocean or underground. The sequestration options are less beneficial in terms of cost per unit $CO_2$ reduction compared to other options.

Each option has advantages and disadvantages in terms of capacity, cost, the time scale of the sequestration, the stability of sequestered $CO_2$, and additional environmental impacts, which depend on the location, time, and amount of sequestration. Reliable evaluations of the mitigation efficiency are desirable for each sequestration option upon implementation (Yamasaki, et al. 2003).

It has been stated that biological sequestration is a natural approach; however, despite this advantage it is now known that there are significant disadvantages. For example, while freshwater marshes have been shown to be strong sinks for carbon dioxide ($CO_2$) on an annual basis relative to other wetland types, it is likely that these ecosystems are also strong emitters of methane ($CH_4$), reducing their carbon (C) sequestration potential. Thus, the substantial $CH_4$ emissions from marshes need to be considered in national and global estimates of wetland greenhouse gas contribution to the global carbon cycle (Strachan et al, 2015).

Ocean sequestration is another approach that can be characterized as being natural. Although the oceans represent possibly the largest potential $CO_2$ sink, ocean sequestration involves problems including poorly understood physical and chemical processes, efficiency, cost, technical feasibility, and possibly the most worrying, long-term environmental impact. In addition, ocean circulation poses legal, political and international limitations to this technology. Carbon dioxide forms carbonic acid when dissolved in water, so ocean acidification is a significant consequence of elevated carbon dioxide levels, and limits the rate at which it can be absorbed into the ocean.

The sequestration of $CO_2$ by a sacrificial material that will then be used or disposed of represents a crossover between the two categories. For example, mineral $CO_2$ sequestration, i.e., carbonation of alkaline silicate Ca/Mg minerals, may be considered analogous to natural weathering processes. Mineral $CO_2$ sequestration may be considered for the reduction of carbon dioxide emissions to the atmosphere. However, the total volume of material required to make an impact on global $CO_2$ emissions would be cost prohibitive (Huijens, et al., 2005).

At this time, $CO_2$ sequestration in geological media appears to be an option for long-term sequestration of $CO_2$. In such a system it is proposed that $CO_2$ may be stored deep underground. At depth, hydrostatic pressure acts to keep it in a liquid state (White, et al., 2005).

Sequestration in deep underground formations of large amounts of $CO_2$, captured from large stationary sources, such as power plants, oil upgraders and refineries, is one method that is under consideration for reducing greenhouse gas emissions to the atmosphere in Canada and United States (Bennion and Bachu, 2005).

While hydrostatic pressure acts to keep $CO_2$ in a liquid state, this does not ensure that leakage cannot occur. In fact, this is one of the biggest problems with the technology. Reservoir design faults, rock fissures and tectonic processes may act to release the gas stored into the ocean or atmosphere. Leak detection using direct measurements, chemical tracers, and seismic monitoring are therefore critical. The Weyburn-Midale Carbon Dioxide Project (or IEA GHG Weyburn-Midale $CO_2$ Monitoring and Storage Project) as of 2008, was the world's largest carbon capture and storage project. However, questions of $CO_2$ leaks from the project have been raised.

While in a typical well, the $CO_2$ would be sealed by capping the well with cement, degradation of the cement may prevent such wells from being a long-term solution. Exposure of well cements to $CO_2$ results in the formation of different $CaCO_3$ modifications, proving carbonation. Carbonation rates were relatively low, but most detrimental were the cracking of specimens as a result of massive $CaCO_3$ formation which comes along with expansion (Lesti et al., 2013). Although some of the reactions with cement can be beneficial, a loss of compressive strength of the cement is observed (Condor and Asghan, 2009).

In summary, current $CO_2$ geologic sequestration technology suffers various problems and inadequacies. Failure of the geologic formation or reservoir to contain the $CO_2$ due to cement failure may result in catastrophic release of vast quantities of $CO_2$ at some undetermined point in the future.

BRIEF SUMMARY OF THE INVENTION

Subject matter of this disclosure provides a method for sequestration in deep underground formations of large amounts of $CO_2$, with improved risk of leakage such as, for example, long-term leakage.

In an embodiment, a sequestration method may include storing $CO_2$ in an underground formation by introducing the $CO_2$ into a well formed in the formation by hydraulic fracturing, and closing the hydraulic fractures to seal the well with the $CO_2$ stored in the formation and prevent escape of the stored $CO_2$ through the well fractures. In an embodiment, such a sequestration method may include introducing the $CO_2$ into a well formed by hydraulic fracturing for the production of shale gas from a reservoir of the underground formation. In an embodiment, a method for large-scale sequestration of $CO_2$ may include introducing the $CO_2$ into a plurality of wells formed by hydraulic fracturing associated with production of shale gas from reservoirs of at least one underground formation, such as a regional formation, wherein the well includes sealed hydraulic fractures preventing escape of stored $CO_2$ from the formation through the hydraulic fractures.

In an embodiment, a sequestration system may include a well formed in the formation by hydraulic fracturing, $CO_2$ stored in the formation by introducing the $CO_2$ through the well, and a closed hydraulic fracture of the well sealing the stored $CO_2$ in the formation to prevent escape of the stored $CO_2$ through the well fracture. In an embodiment, a sequestration system may include a well formed by hydraulic fracturing associated with production of shale gas from a reservoir of the underground formation. In an embodiment, a large-scale sequestration system may include a plurality of wells formed by hydraulic fracturing associated with production of shale gas from reservoirs of at least one underground formation, such as a regional formation, wherein the well includes sealed hydraulic fractures preventing escape of stored $CO_2$ from the formation through the hydraulic fractures.

In an embodiment, a $CO_2$ sequestration system includes a well formed in the formation by hydraulic fracturing, $CO_2$ stored in the formation, and the well including sealed hydraulic fractures preventing escape of stored $CO_2$ from the formation through the hydraulic fractures. In an embodiment, such a sequestration system may include a well formed by hydraulic fracturing associated with production of shale gas from a reservoir of the underground formation. In an embodiment, a large-scale sequestration system may include a plurality of wells formed by hydraulic fracturing associated with production of shale gas from reservoirs of at least one underground formation, such as a regional formation, wherein the well includes sealed hydraulic fractures preventing escape of stored $CO_2$ from the formation through the hydraulic fractures.

It will be understood that shale gas represents the largest fraction of natural gas in the continental United States. With an estimated 482 trillion cubic feet (Tcf) of hydrocarbon (Nicot and Scanlon, 2012), shale gas has the potential to be the primary energy source for power generation in the US for the coming decades. The ability to extract shale gas in an economic and timely manner has been achieved by the development and use of hydraulic fracturing and horizontal drilling techniques. Hydraulic fracturing (also known as "fracing" or "fracking") uses water, proppant, and various chemical additives, pumped at high pressures into the well bore, to induce fracturing of the shale source rock and thus create greater permeability so the gas can migrate into the well bore and to the surface. The fracturing fluid chemistry is tailored on a case-by-case basis for each geographical area and sometimes even on a well-by-well basis.

The reason that fracking is necessary is that shale has very low permeability (concrete is 102-104 more permeable) and there has been little or no movement of fresh water (or waters of a different mineral content) since the rock was formed. Furthermore, shale is under-saturated to water and the level of salt in the connate water within the shale is often at salinity equal to the seawater the shale was deposited from. In other words, shale is a reactor waiting for an influx of fresh ingredients, and thus when under saturated fresh water or even moderate salinity water is introduced during a frac, salts, some organics, and other minerals that were in equilibrium with the connate waters are solubilized. What is most important is that the shale reservoir has been "isolated" from external chemistry for several million years. In other words, until the reservoir was fracked there is no route for the gas to escape, meaning that if the natural gas could be exchanged for $CO_2$ and the reservoir returned to its pre-frack state the $CO_2$ would be contained by the same forces that contained the gas for millions of years. Given that shale gas in the U.S. is formed during the Jurassic period this gives an estimated stability of over 100 million years.

The present disclosure provides a system, method and apparatus for the removal of natural gas/methane from in situ loci within wells to (i) provide fully de-carbonized surplus electricity, and (ii) power the re-injection of the resulting carbon formed ($CO_2$) upon combustion in the electric generator along with large volumes of atmospheric $CO_2$, culminating in a technically and commercially feasible, permanent, in terms of geologic time, large scale removal of $CO_2$ from the Earth's surface/atmosphere.

For the methane molecules produced, this is a cradle-to-grave cycle wherein the same carbon atoms that are harvested and used for power generation are then returned to their original geologic resting place through the same fracture system, pipe and compression that delivered them into power generation service.

Once the shale reservoir and fracture systems are at or near full volumetric storage capacity with sequestered $CO_2$ (at or near discovery pressure), the specialized proppant used in this invention is dissolved by injecting an acidic aqueous solution, thus allowing the geologic forces, previously resisted by the proppant, to collapse and seal closed the fracture system, permanently trapping the $CO_2$ within the rock.

Concerning de-carbonization, the result of this process via this invention is the permanent, in terms of geologic time, storage of $CO_2$ that is not dependent upon wellbore sealing or the long term integrity thereof. Concerning fully de-carbonized power generation, this system fully supports the continued and economic use of intermittent supplies of electricity such as wave, wind and solar generators.

The components of an embodiment may include large cohorts of hydrocarbon productive shale wells that may be stimulated by hydraulic fracturing utilizing certain select reservoir fluids suffused with specialized proppant (the particles maintaining fracture patency during production and re-injection) which may be dissolved at the end of the $CO_2$ sequestration cycle with a small volume of an acidic aqueous solution. Embodiments may further include natural gas and carbon dioxide compatible surface facilities such as compression, dehydration, filter/separators and measurement equipment which may be functionally bi-directional.

Embodiments may optionally include, in certain circumstances, natural gas and/or carbon dioxide smaller scale temporary storage reservoirs or surface facilities which may facilitate the logistics of material movements and placement.

Embodiments may optionally include large (e.g. multi-hundred MW F-class combined cycle turbines) and/or small (peaking gas fired generators) scale electric power generating and ancillary equipment.

Embodiments may optionally include pre-combustion (e.g. oxy-fuel systems which provide $O_2$ for combustion with the natural gas) and/or post-combustion carbon dioxide capture systems (e.g. electrolytic amine or Ca(OH)$_2$ systems).

Embodiments may optionally include freshwater surface handling facilities.

Sequestration of $CO_2$ underground is hampered by the paucity and adverse locational distribution of suitable reservoirs to serve as economically feasible containers of large volumes of $CO_2$. Certainly depleted conventional reservoirs and deep aquifers could serve in this role. However, their relative limited capacity to meet the magnitude of the need and/or difficulties in overcoming discovery pressures are very challenging aspects to their utilization, irrespective of availability and location.

It may be vastly more efficient to store $CO_2$ in shales depleted of methane or $CH_4$. Results have shown that $CO_2$ has approximately two to three times the adsorptive capacity of $CH_4$ in both the pure mineral constituents and actual shale samples (R. Heller and Zoback, 2014). This does not include the volume attained by the proppant.

Given that natural gas is predominantly methane ($CH_4$), its combustion during power generation would result in one molecule of $CO_2$ per molecule of $CH_4$ combusted. Combustion may be represented by the following equation: $CH_4 + 2O_2 \rightarrow CO_2 + 2H_2O$. Based upon this, it can also be assumed that for every two to three molecules that can be adsorbed within a well, one of the $CO_2$ molecules was generated during power generation using the produced methane or $CH_4$. Therefore, shale can be used for an over adsorption of one to two equivalents of $CO_2$ per each $CH_4$ produced from the original wells. This makes the entire process profoundly net reductive of atmospheric $CO_2$. In this regard, it is possible to make natural gas electricity production, using shale gas and current infrastructure, a large contributor of net negative emissions of $CO_2$.

While embodiments usable within the scope of the present disclosure can be powered using on-site using reciprocating engines (e.g., diesel engines), coupled with turbine generators and/or similar power systems, in an embodiment, one or more system components can be configured for use with electrical power. For example, the pressure subsystem can include an electric-powered driver (e.g., an electric motor or similar source of force) in communication with and actuating the pump, while an electrical power source powers the electric-powered driver. In an embodiment, a turbine generator (e.g., a natural gas turbine or similar source) can be used to provide power to an electric motor, which in turn drives the pump. Alternatively or additionally, a grid-based power source can be used to power the electric-powered driver. In an embodiment, an electric-powered driver can be configured for selective and/or simultaneous operation using a grid-based or an on-site power source. Where a grid-based power sourced is used, in an embodiment, one or more additional transformers can be used to convert power from the grid-based power source to a desired voltage. In use, a single pump can be actuated using a single electric-powered driver or multiple electric-powered drivers, and multiple pumps can be actuated using a single electric-powered driver or multiple electric-powered drivers. Similarly, a single power source can power one or multiple electric-powered drivers, or one or multiple electric-powered drivers can be powered by multiple power sources.

BRIEF DESCRIPTION OF THE DRAWINGS

The novel features believed characteristic of the disclosed subject matter will be set forth in any claims that are filed. The disclosed subject matter itself, however, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Figure 1:
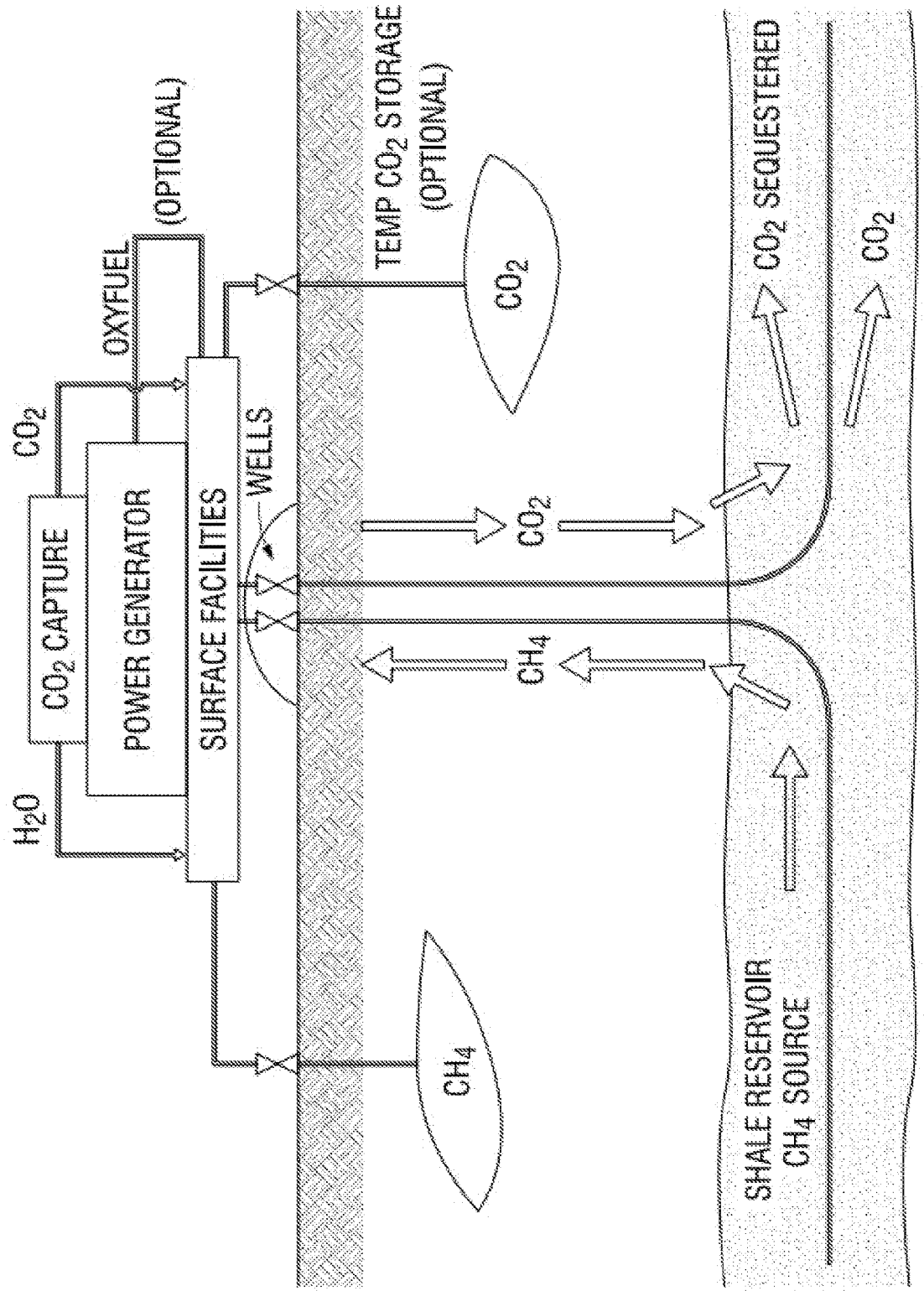
FIG. 1 illustrates an exemplary components diagram of the present disclosure.

Reference now should be made to the drawings, in which the same reference numbers are used throughout the different figures to designate the same components.

Before describing selected embodiments of the present invention in detail, it is to be understood that the present invention is not limited to the particular embodiments described herein. The disclosure and description herein is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended illustrate and plainly disclose presently preferred embodiments of the invention to one of skill in the art, but are not intended to be manufacturing level drawings or renditions of final products and may include simplified conceptual views as desired for easier and quicker understanding or explanation of the invention. As well, the relative size and arrangement of the components may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

The present disclosure may provide to the oil/natural gas industry efficient systems and methods for storing $CO_2$ in shales depleted of $CH_4$.

The U.S. Energy Information Administration (EIA) estimates in the Annual Energy Outlook 2015 that about 11.34 trillion cubic feet of dry natural gas was produced directly from shale and tight oil resources in the United States in 2013. If we assume that 11 trillion cubic feet of $CH_4$ is produced, this is equivalent to 311 trillion L. At standard temperature and pressure, 22.4 L is equal to 1 mole of any gaseous material. Thus, 311 trillion L of $CH_4$ is equal to 13.884 trillion moles $CH_4$ produced.

The molar mass of $CO_2$ is 44 g/mol. If we assume a 1-fold excess of $CO_2$ would be sequestered in addition to the $CO_2$ generated in $CH_4$ combustion. Then 13.884 trillion moles $CO_2$ would equal 610 trillion g of $CO_2$. 610 trillion g of $CO_2$ is equal to 610 million (metric) ton of $CO_2$. This would represent the amount of excess $CO_2$ sequestered into the shale reservoirs once the process reaches steady state per year assuming a two-fold exchange. If the value is closer to three-fold then the amount of $CO_2$ sequestered in excess of that used in power generation would be 1,220 million tons of $CO_2$.

On average the US emits 5,000 million ton of $CO_2$ per year from all sources. The main source is power generation. Assuming the ability of shale reservoirs to sequester two to three times the adsorptive capacity of $CH_4$ in the wells, then this process would result in a roughly 12-24% reduction in $CO_2$ emissions in the US. The EU has set a target of reducing greenhouse gas emissions by 40% by 2030. It was intended that this should be simply by generation changes. However, using this process almost half of this target could be achieved without alteration of the infrastructure needs of the power generation or chemical industry who are the major uses of hydrocarbon combustion for electricity and energy (heat) generation.

FIG. 1 illustrates an exemplary components diagram of a system 100 for storing carbon compounds in an underground reservoir 200 in accordance with embodiments. In embodiments, system 100 may include components to inject a fluid under pressure into an underground reservoir via a well 110. For example, system 100 may be used to stimulate the production (e.g., of hydrocarbons) by forming fractures in the well 110 through the provision of a pressurized proppant (that may be mixed with a fracturing fluid) through the well 110 and into the underground reservoir 200 to maintain and/or support the fractures while permitting the flow of hydrocarbons or other fluids from the formation into the well 110 and toward the surface. FIG. 1 may subdivide the depicted system into a first subsystem: a fluid addition subsystem 120 for providing fracturing fluid or a similar medium to the underground reservoir 200, a second subsystem: a proppant addition subsystem 130 for providing proppant or a similar medium into the fracturing fluid, a third subsystem: a solvent addition subsystem 140 adapted to provide a solvent for dissolving the proppant to the underground reservoir 200, a power subsystem 150 for providing power to one or more components of the system 100, and a pressure subsystem 160 for pressurizing fluid for injection into the underground reservoir 200. The pressure subsystem 160 may comprise a pump in communication with the fluid and the proppant in order to pressurize at least one of the fluid and the proppant to a pressure sufficient to stimulate the underground reservoir 200. In embodiments, the pump may be in further communication with the solvent for pressurizing the solvent to a pressure sufficient to deliver the solvent to the underground reservoir 200.

It should be understood that the number, type, and arrangement of components shown in FIG. 1 is only one exemplary embodiment, and that the depicted illustration is diagrammatic, intended to conceptually depict one embodiment of the present system. As such, it should be noted that any number, type, and arrangement of identical or similar components could be used without departing from the scope of the present disclosure. Further, while the depicted embodiment includes multiple subsystems (120, 130, 140, 150, 160) used in combination, it should be understood that in various embodiments, the fluid addition subsystem 120 could be used in the absence of the other subsystems (130, 140, 150, 160) and/or in combination with conventional systems and/or components. Similarly, the proppant addition subsystem 130, the solvent addition subsystem 140, and the power and pressure subsystems 150, 160 may be used independently or in combination with conventional systems and/or components without departing from the scope of the present disclosure.

In embodiments, the solvent addition subsystem 140 may comprise elements similar to that of the fluid addition subsystem 120 and the proppant addition subsystem 130. But due to the corrosive nature of the solvent, embodiments of the solvent addition subsystem 140 may comprise components including corrosive resistant interiors. This may reduce the frequency that components of the solvent addition subsystem 140 may need to be replaced.

In embodiments, system 100 may comprise a removal subsystem 170 to remove the natural gas from the underground reservoir 200. The removal subsystem 170 may be incorporated within the pressure subsystem 160. In embodiments, the mechanism to pump fluids or other materials may be reversed in order to pump hydrocarbons out of the underground reservoir 200.

It is noted that, in embodiments, the removed natural gas may act as a fuel source for the production of electricity. This electricity may be used as a power source by system 100 and may be utilized to run components of system 100 to pump carbon compounds back into the underground reservoir 200, thus saving money on the cost of running system 100. A power conversion unit 155 may aid in this production of the electricity. The power conversion unit 155 may break down the hydrocarbons pumped out of the well 110 (via combustion) and may produce electricity as well as byproducts, such as, but not limited to, carbon compounds including $CO_2$ and $H_2O$. The carbon compounds may be captured and subsequently pumped back into the underground reservoir 200 with the aid of the electricity (acting as a power source) produced by the power conversion unit 155. In embodiments, the power subsystem 150 may encompass the power conversion unit 155.

Once the underground reservoir 200 is at or near full volumetric capacity with sequestered $CO_2$ (at or near discovery pressure), in embodiments, the proppant may be dissolved by injecting the aqueous solvent into the well, which may allow the geologic forces previously resisted by the proppant to collapse and seal closed the underground reservoir 200. The $CO_2$ thus may be trapped within the rock underground.

Figure 2:
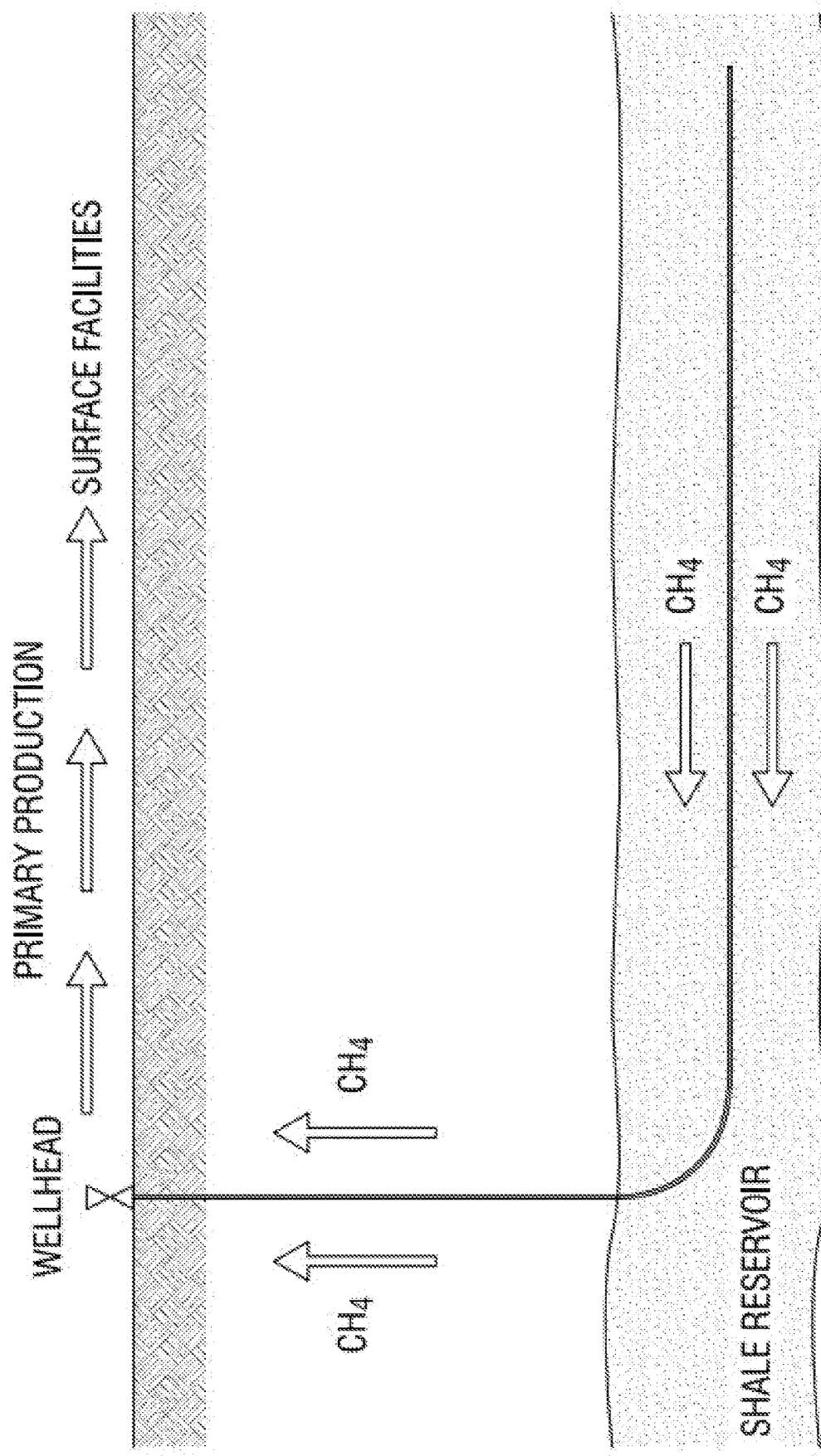
FIG. 2 illustrates an exemplary production flowchart diagram of the present disclosure.

FIG. 2 illustrates an exemplary production flowchart diagram 200 of the present disclosure. As shown, produced gas may be removed using pressure subsystem 160. Once removed, the gas may be transferred to the power subsystem 150. It is at this point that the gas may be burned, which may produce $CO_2$ and $H_2O$ (1 BCF of $CH_4$ generates 11 MM gallons of pure fresh $H_2O$), both of which may be captured and at least temporarily stored in appropriate storing chambers 210.

Figure 3:
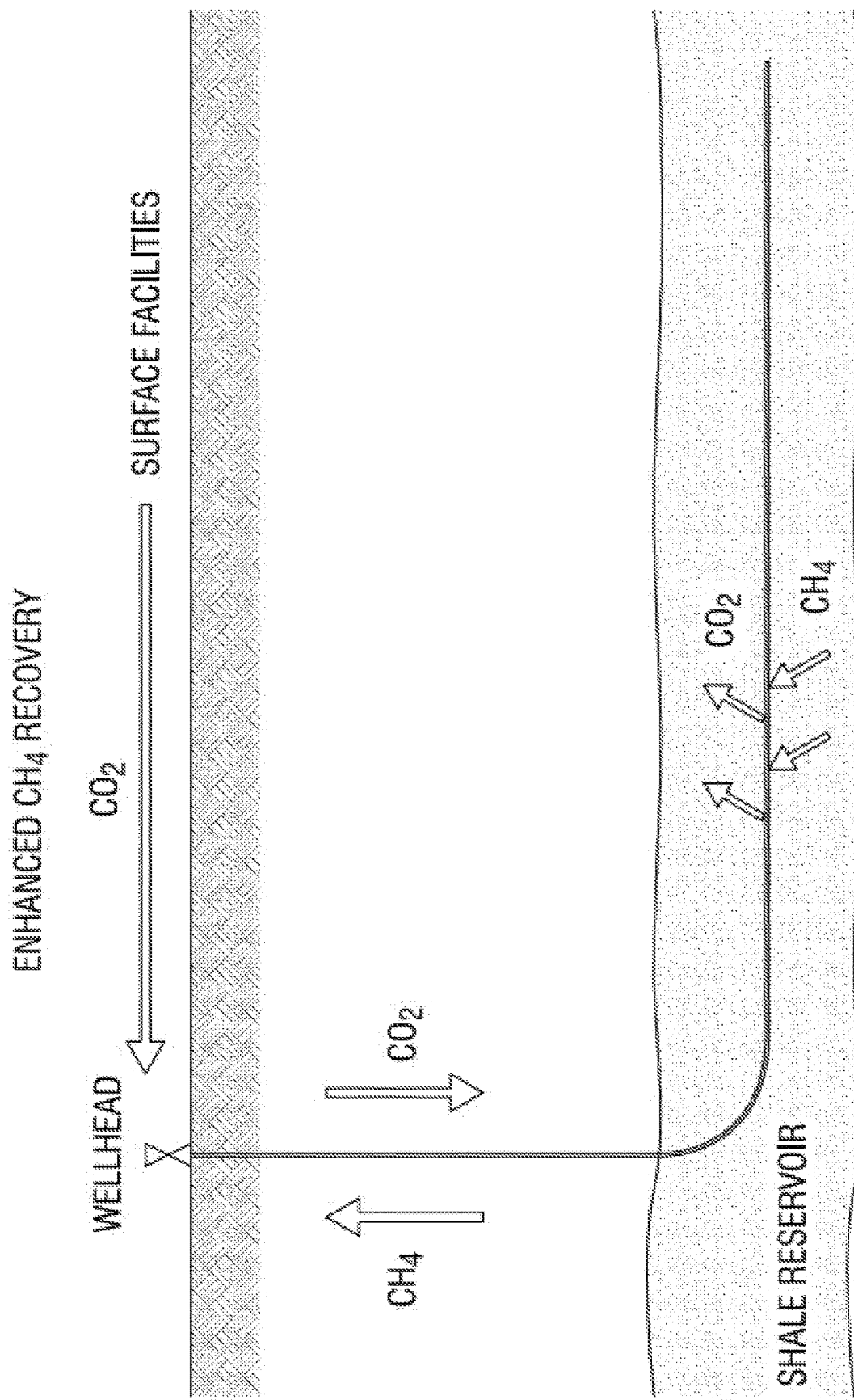
FIG. 3 illustrates an exemplary $CH_4$ recovery flowchart diagram of the present disclosure.

FIG. 3 illustrates an exemplary $CH_4$ recovery flowchart diagram 300 of the present disclosure. In some instances, it may be feasible/desirable to periodically re-inject $CO_2$ into the depleting shale reservoir which induces greater desorption of $CH_4$ and thus more natural gas production. This may be carried out using pressure subsystem 160. The pressure subsystem 160 may comprise a dual inlet/outlet and associated transferring equipment that may allow simultaneous extraction and transport of $CH_4$ and $CO_2$. This is because shale reservoirs often more adsorptive of $CO_2$ than $CH_4$. See reference below.

Figure 4:
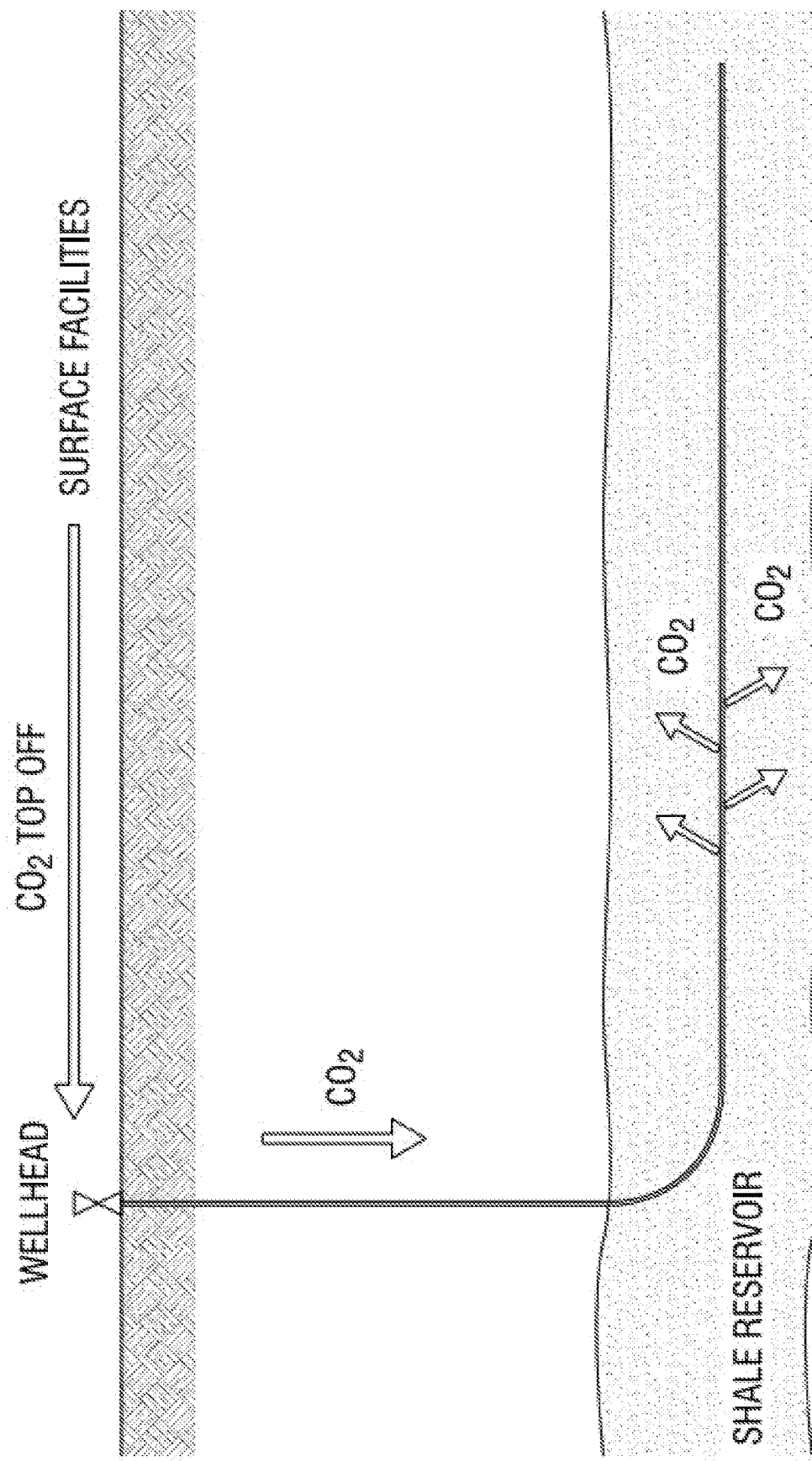
FIG. 4 illustrates an exemplary $CO_2$ top-off flowchart diagram of the present disclosure.

FIG. 4 illustrates an exemplary $CO_2$ top-off flowchart diagram 400 of the present disclosure. Upon completion of the cycle, according to an embodiment a process may result in the sequestration of more $CO_2$ than is generated from electric power made with the produced $CH_4$. In one aspect, a result may be low cost ubiquitously available electricity accompanied by profound net decreases in planetary $CO_2$.

According to disclosed subject matter, produced/vacating gas provides a permanent container or containment for all of the $CO_2$ this production creates upon combustion, and further may provide containment for even greater volumes of $CO_2$ removed directly from the atmosphere by the system 100 when electric generation operations are not fully underway or idled. In embodiments, machinery that may extract additional $CO_2$ from the atmosphere may be utilized in connection with other components of system 100.

Figure 5:
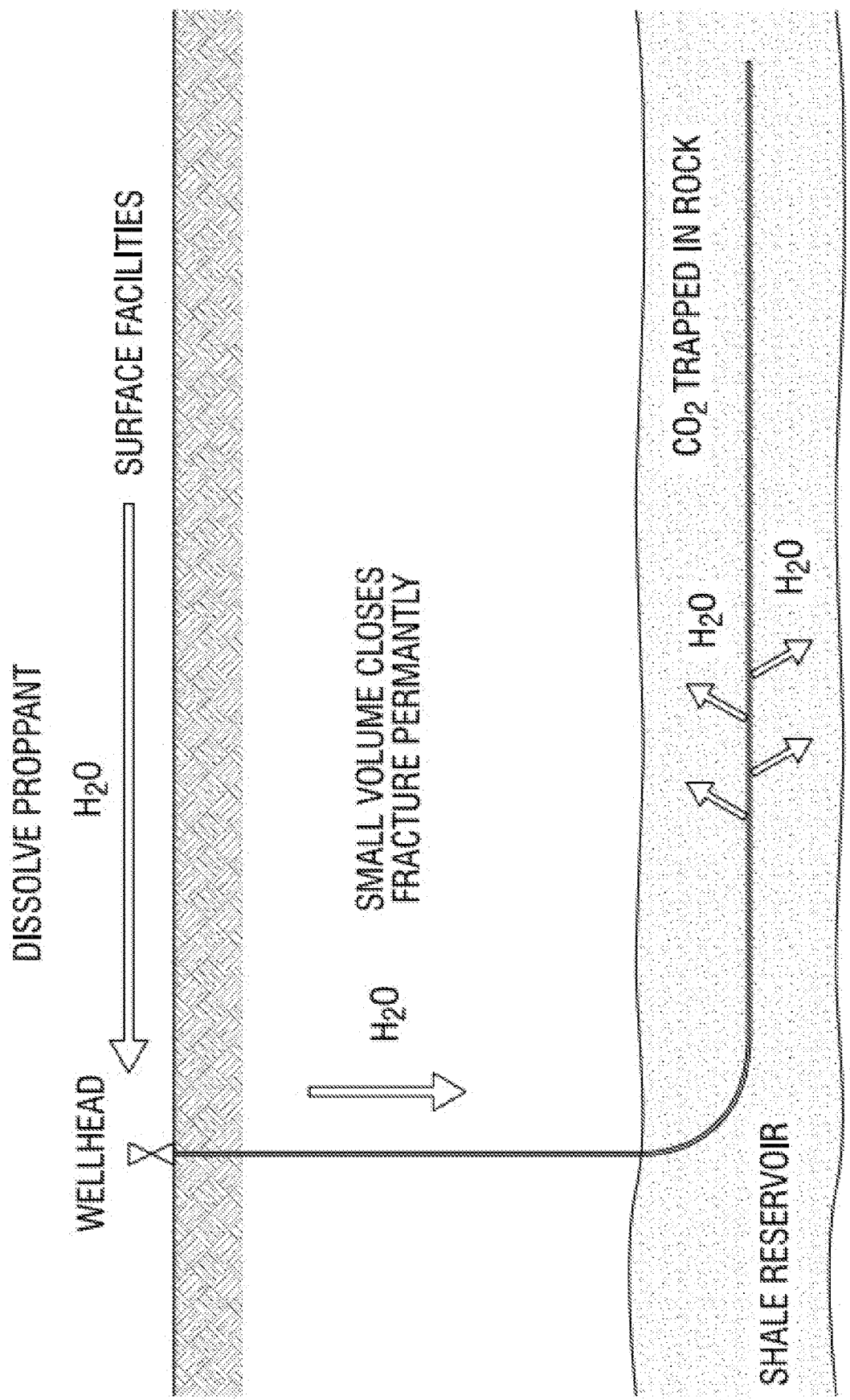
FIG. 5 illustrates an exemplary dissolve proppant flowchart diagram of the present disclosure.

FIG. 5 illustrates an exemplary dissolved proppant flowchart diagram 500 of the present disclosure. In a final stage, the proppant may be dissolved to allow permanent closure of the fractures by the enormous geologic pressure that has been temporarily resisted by the proppant particles. Once sealed, the $CO_2$ may be stored in the rock throughout geologic time and may not be vulnerable to loss of the integrity of the well bores used to access the reservoir.

Figure 6:
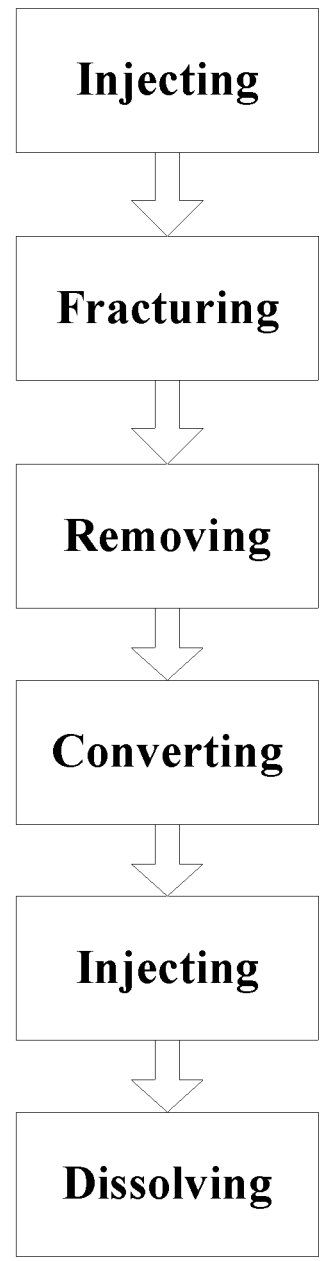
FIG. 6 displays a method for storing carbon compounds in an underground reservoir.

FIG. 6 displays a method 600 for storing carbon compounds in an underground reservoir. Method 600 may comprise injecting proppant into an underground reservoir 200. The proppant may be injected using a proppant addition subsystem 130. Additionally, a fluid addition subsystem 120 may provide fluid to the underground reservoir in addition to the proppant. Once injected, the proppant may fracture the underground reservoir 200, allowing for accessibility of hydrocarbons. The hydrocarbons may be removed from in situ loci within the underground reservoir 200 using a pressure subsystem 160.

Once extracted, the hydrocarbons may be converted into electricity via processing of the hydrocarbons. The conversion may include, in embodiments, capturing a byproduct from the converting of the hydrocarbons into electricity. In embodiments, the byproduct may include carbon compounds. Once the hydrocarbons are processed, carbon compounds created during the processing may be injected into the underground reservoir 200. This may be carried out using the pressure subsystem 160. In embodiments, the pressure subsystem 160 may comprise reversible components so that pumping out of the ground and into the ground may be accomplished. After the desired amount of carbon compounds have been injected into the underground reservoir 200, the proppant transferred into the underground reservoir may be dissolved. This may allow for the collapsing of the underground reservoir 200 and the trapping of the carbon compounds.

Figure 7:
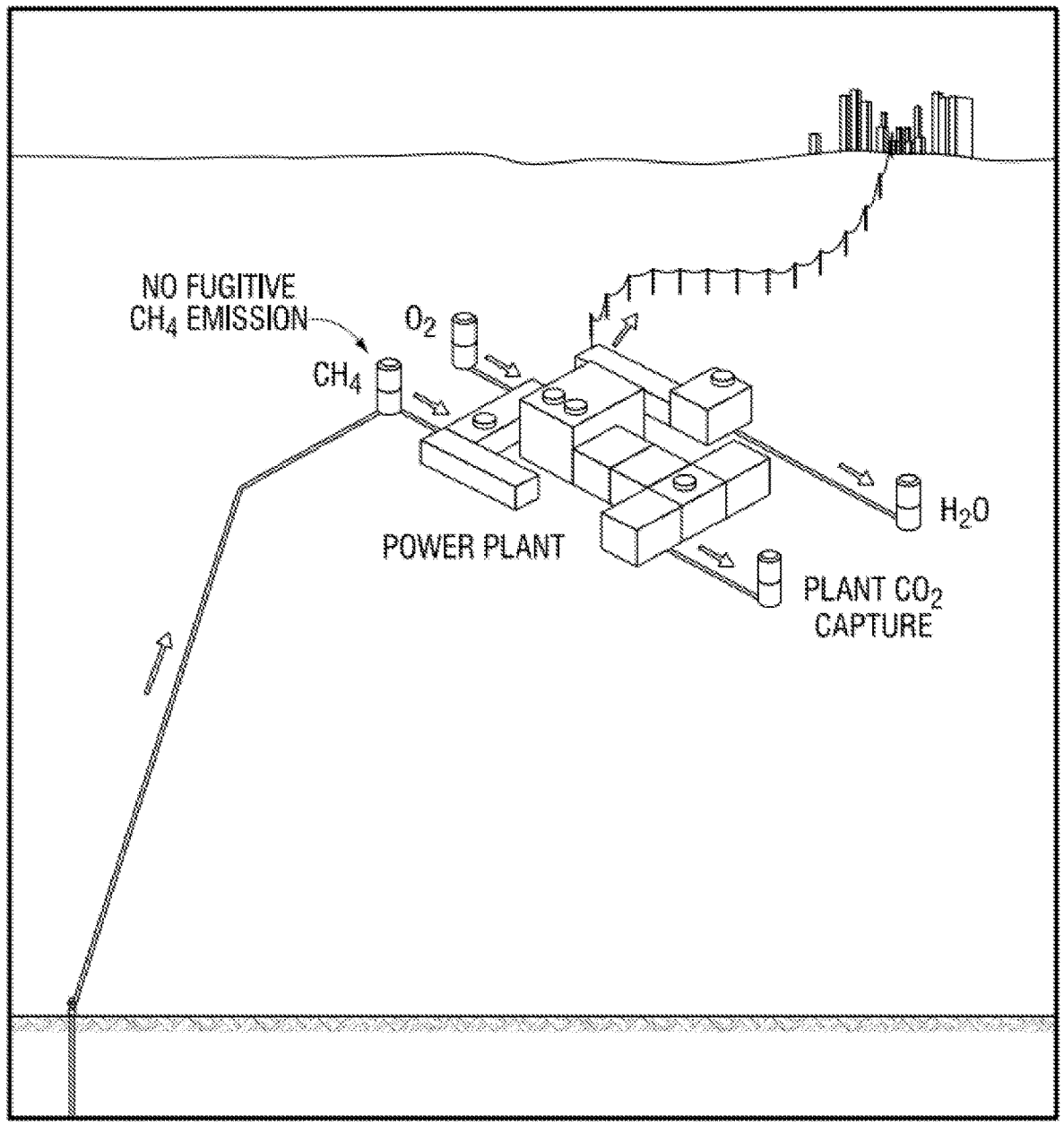
FIG. 7 illustrates an exemplary production flowchart diagram of the present disclosure.

FIG. 7 illustrates an exemplary production flowchart diagram of the present disclosure. The natural gas/methane which has been extracted may be used for electric power generation. The $CO_2$ that is formed upon combustion of the natural gas in the electric generator may be separated and captured to be re-injected into the shale fractures for permanent sequestration. Large quantities of pure water ($H_2O$) may also be formed when the natural gas is burned with pure oxygen ($O_2$) rather than air.

Figure 8:
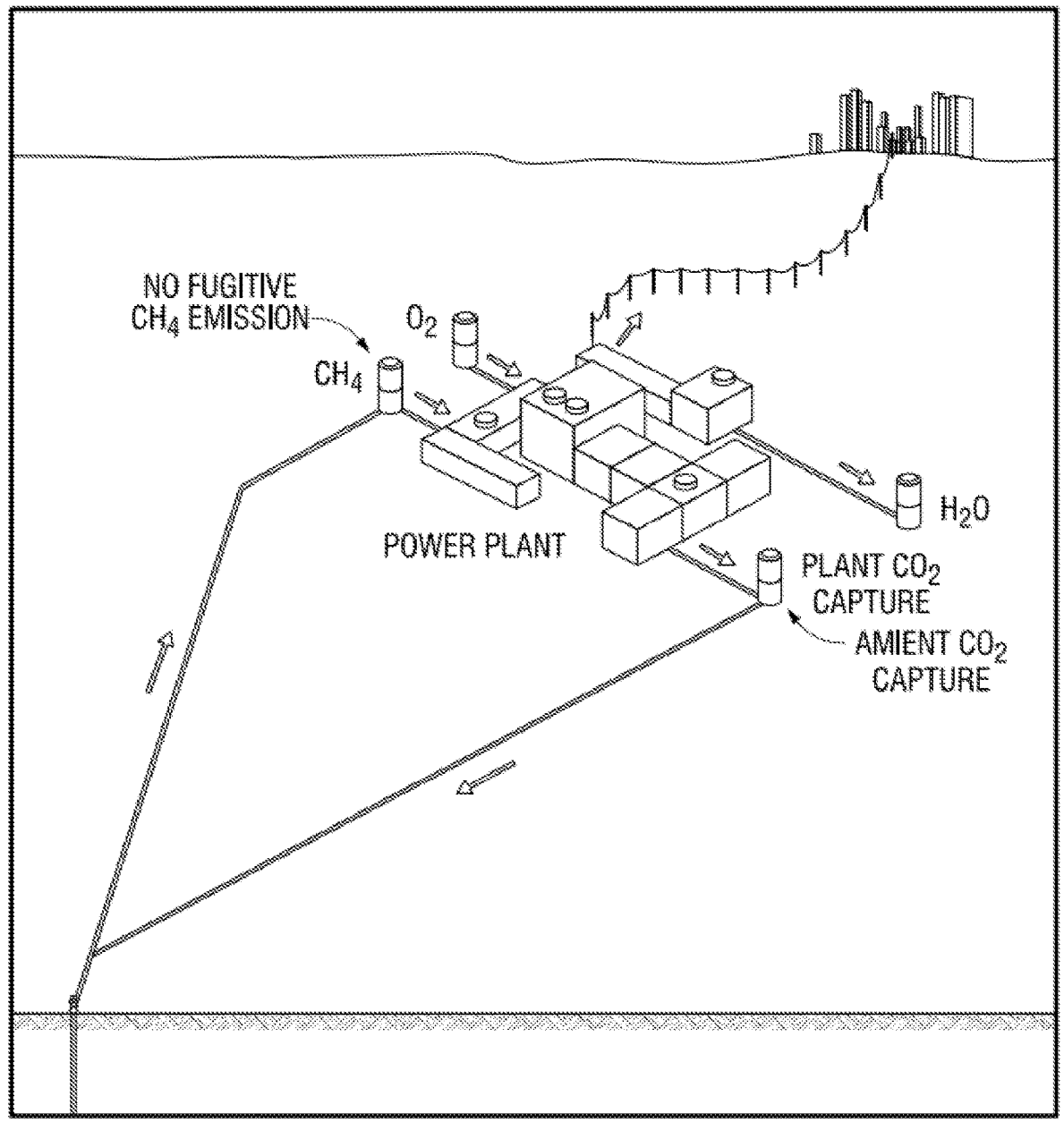
FIG. 8 illustrates an exemplary production flowchart diagram of the present disclosure.

FIG. 8 illustrates an exemplary production flowchart diagram of the present disclosure. Additional ambient $CO_2$ captured from the atmosphere may be added to the sequestration injection stream, given the shales may be many times more absorptive of $CO_2$ than the original methane.

Figure 9:
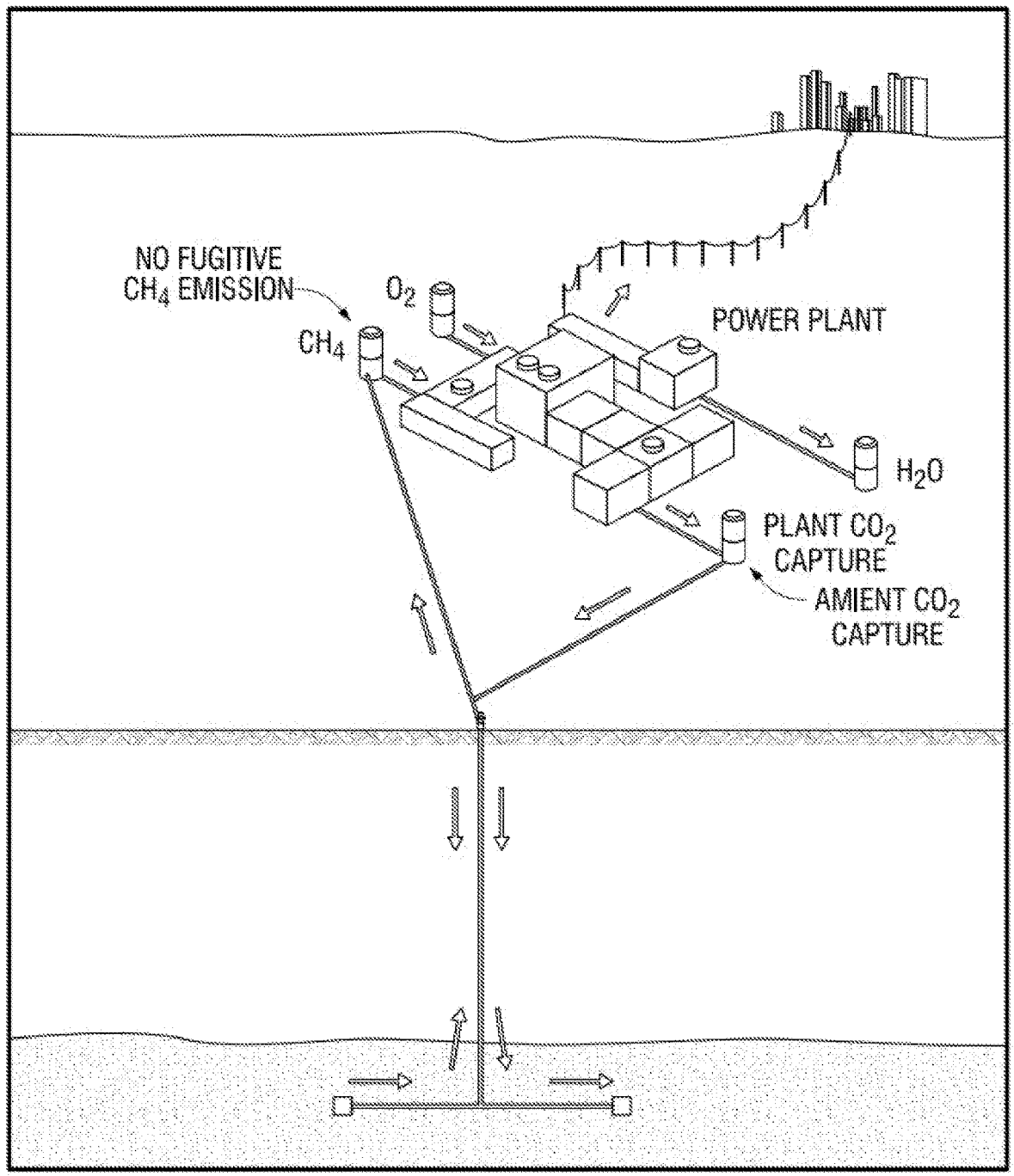
FIG. 9 illustrates an exemplary production flowchart diagram of the present disclosure.

FIG. 9 illustrates an exemplary production flowchart diagram of the present disclosure. Additional ambient $CO_2$ captured from the atmosphere may be added to the sequestration injection stream, which may be shown being injected into the shales.

Further, in an embodiment, system 100 may provide back-up electrical power for the intermittent interruption in power generation provided by wind, wave, and solar devices.

In embodiments, underground reservoir 200 may be a shale reservoir.

In embodiments, hydrocarbons other than CH 4 may be extracted from one or more underground reservoirs 200 and subsequently processed.

In embodiments, the fracturing fluid may comprise light weight alkanes.

In embodiments, the specialized proppant may be dissolved by injecting a low pH fluid into a fracture system.

In embodiments, the light weight alkanes may be recoverable.

In embodiments, pumps may be needed for the $CO_2$.

The following references are relied upon, and are hereby incorporated in their entirety:

Numerical Simulation and Modeling of Enhanced Gas Recovery and $CO_2$ Sequestration in Shale Gas Reservoirs (Amirmasound K. Dahaghi, West Virginia University, Society of Petroleum Engineers 2010).

Carbon Dioxide Storage Capacity of Organic-Rich Shales (S. M. Kang, E. Fathi, R. J. Ambrose, I. Y. Akkutlu, and R. F. Sigal, The University of Oklahoma, Society of Petroleum Engineers 2011).

https://www.netl.doe.gov/publications/proceedings/01/carbon_seq/7b1.pdf http://mitei.mit.edu/news/new-way-capture-co2-emissions-lower-costs-easier-installation https://www.globalccsinstitute.com/content/how-ccs-works-capture http://www.ccsassociation.org/index.php/what-is-ccs/capture/post-combustion-capture/ http://www.ccsassociation.org/what-is-ccs/capture/oxy-fuel-combustion-systems/

In embodiments, the proppant may be boron laced mesoporous amorphous silica.

While various embodiments usable within the scope of the present disclosure have been described with emphasis, it should be understood that within the scope of the appended claims, the present invention can be practiced other than as specifically described herein.

The invention claimed is:

1. A method for storing and extracting carbon compounds in a formation associated with a fracturing well formed by hydraulic fracturing, the method comprising:
   injecting proppant into the formation; fracturing the formation;
   removing hydrocarbons from in situ loci within the formation;
   injecting the carbon compounds into the formation;

injecting a solution into the formation, the solution capable of at least partially degrading the structural integrity of the proppant positioned within the formation;

periodically injecting the carbon compounds into the formation; and at least partially degrading the proppant to collapse fractures and seal the fracturing well, thereby trapping the carbon compounds.

2. The method of claim 1, wherein the proppant being a conventional proppant.

3. The method of claim 1, wherein the formation being a shale reservoir.

4. The method of claim 1, wherein the solution being an alkaline solution.

5. The method of claim 1, wherein the solution being an acidic solution.

6. The method of claim 1, wherein the at least partially degrading. comprises at least partially dissolving the structural integrity of the proppant.

7. A method for storing carbon compounds in a formation associated with a pre-existing fracturing well formed by hydraulic fracturing, the method comprising:

injecting a solution into the formation for creating and maintaining fractures, the solution capable of at least partially degrading the structural integrity of proppant positioned within the formation;

injecting the carbon compounds into the formation;

periodically reinjecting the carbon compounds into the formation; and at least partially degrading the proppant to collapse fractures and seal the pre-existing fracturing well, thereby trapping the carbon compounds.

8. The method of claim 7, wherein the proppant being a conventional proppant.

9. The method of claim 7, wherein the formation being a shale.

10. The method of claim 7, wherein the solution being an alkaline solution.

11. The method of claim 7, wherein the solution being an acidic solution.

12. The method of claim 7, wherein the at least partially degrading comprises at least partially dissolving the structural integrity of the proppant.

13. A method for producing electricity by combustion of hydrocarbons without releasing carbon compounds into the atmosphere, the method comprising:

injecting proppant into a formation;

fracturing the formation;

removing hydrocarbons from in situ loci within the formation;

converting the hydrocarbons into electricity and carbon compounds;

pumping the carbon compounds into the formation;

injecting a solution into the formation, the solution capable of at least partially degrading the structural integrity of proppant positioned within the formation; and at least partially degrading the proppant to collapse fractures and seal a pre-existing fracturing well in the formation, thereby trapping the carbon compounds.

14. The method of claim 13, wherein a volume of the carbon containing compounds is greater than a volume of the removed hydrocarbons.

15. The method of claim 13, wherein the proppant being a conventional proppant.

16. The method of claim 13, wherein the formation being a shale.

17. The method of claim 13, wherein the solution being an alkaline solution.

18. The method of claim 13, wherein the solution being an acidic solution.

19. The method of claim 13, wherein the at least partially degrading comprising comprises at least partially dissolving the structural integrity of the proppant.

20. A system for storing and extracting carbon compounds in an underground reservoir, said system comprising:

a first supply subsystem adapted to provide a fracturing fluid to the underground reservoir;

a second supply subsystem adapted to provide a proppant to the fracturing fluid in the underground reservoir;

a third supply subsystem adapted to provide a solvent for dissolving the proppant to the underground reservoir;

a pressure subsystem comprising a pump in communication with the fluid and the proppant for pressurizing at least one of the fluid and the proppant to a pressure sufficient to stimulate the underground reservoir, and wherein the pump is in communication with the solvent for pressurizing the solvent sufficient to deliver the solvent to the underground reservoir;

a removal subsystem for removing hydrocarbons from the underground reservoir; and a power subsystem for producing electricity and carbon compounds from the hydrocarbons, wherein the carbon compounds are injected back into the underground reservoir, wherein when the underground reservoir is at or near full volumetric capacity with sequestered carbon compounds, the proppant is dissolved by injecting the solvent to collapse and seal the underground reservoir for trapping the carbon compounds underneath the underground reservoir.

21. The system of claim 20, wherein the power subsystem produces electricity and byproducts from the hydrocarbons.

22. The system of claim 21, wherein the byproduct produced includes the carbon compounds.

23. The system of claim 20, wherein the underground reservoir being a shale reservoir.

* * * * *